T. W. GLASSEY.
PLOW SCRAPER.
APPLICATION FILED APR. 10, 1918.
1,280,206.
Patented Oct. 1, 1918.
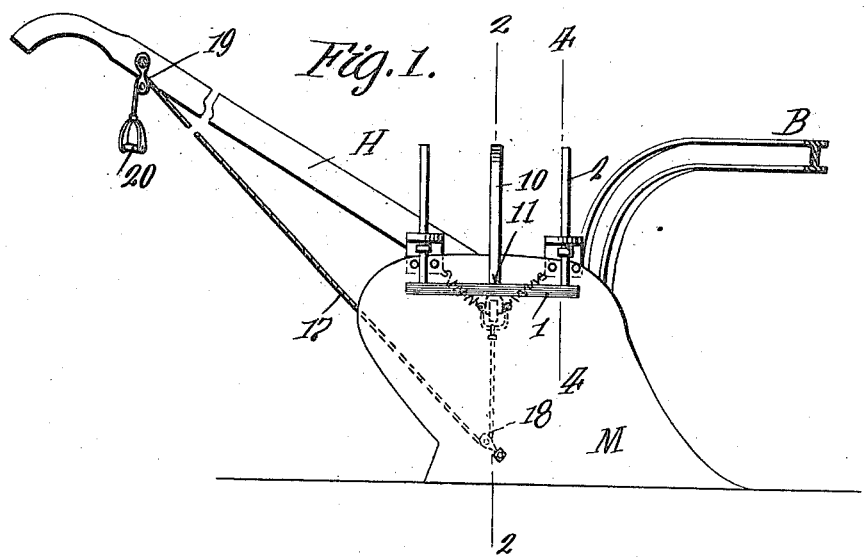
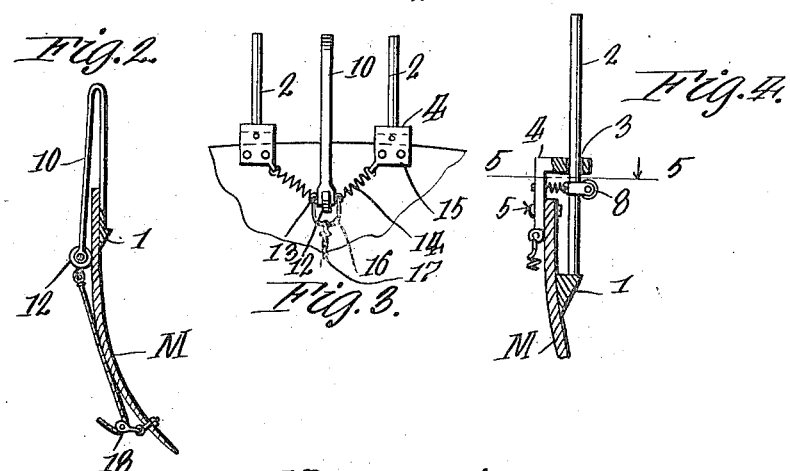
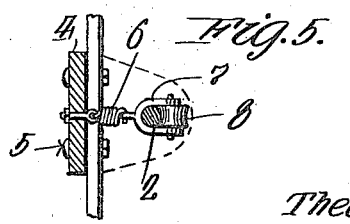
INVENTOR
Theodore Glassey
WITNESSES
BY
ATTORNEY

UNITED STATES PATENT OFFICE.

THEODORE W. GLASSEY, OF WALLOWA, OREGON.

PLOW-SCRAPER.

1,280,206. Specification of Letters Patent. Patented Oct. 1, 1918.

Application filed April 10, 1918. Serial No. 227,771.

*To all whom it may concern:*

Be it known that I, THEODORE W. GLASSEY, a citizen of the United States, residing at Wallowa, in the county of Wallowa and State of Oregon, have invented certain new and useful Improvements in Plow-Scrapers, of which the following is a specification.

This invention relates to plows, and more particularly it is a scraper intended to clean the mold board of accumulated soil or mud from time to time.

One object of the invention is to provide means for holding the scraper close to the dished or outer side of the mold board.

Another object is to provide means for actuating the scraper from a point adjacent the handle.

Other objects will appear in the following specification and claims and reference is made to the drawings, wherein:—

Figure 1 is an elevation of a plow with this device attached,

Fig. 2 is a section on the line 2—2 of Fig. 1,

Fig. 3 is an enlarged view showing the supporting springs at the inner side of the mold board, Fig. 4 is an enlarged section on the line 4—4 of Fig. 1, and Fig. 5 is a still further enlarged detail on the line 5—5 of Fig. 4.

The plow herein illustrated is composed of the mold board M attached to the beam B, and H designates the handles. In Fig. 1 we are supposed to be looking at the dished outer side of the mold board whereas in Fig. 3 it is the rounded or inner side thereof which is exposed. It is well known to those who have used plows in the ground when it is muddy or in soil which has a large percentage of clay or other sticky substance in it, that the face of the mold board frequently becomes gummed or covered with accumulations which adhere thereto in the progress of the plow through the furrow to such an extent as to impede the action of the same, to throw heavy labor onto the horse or team, and to interfere with the success of the plowing operation. It is the purpose of my present invention to attach to the plow share or mold board a scraper which may be manipulated by the operator without leaving his position at the rear of the handles H.

Coming now to the details of the present invention, the numeral 1 designates the scraping blade itself, which, as seen in Fig. 4, is by preference of triangular cross section and it may or may not be curved slightly throughout its length so as to correspond with the horizontal curvature of the mold board M if the same exists. It may, in fact, be a rather flexible or resilient member, and the obvious purpose is to cause its active edge to move in close contact with the dished face of the mold board. Rising from the upper edge of this scraper blade is a pair of rods 2 slidably and quite loosely mounted through eyes 3 at the upper ends of brackets 4 which are secured by bolts 5 to the mold board M at its upper edge and serve as guides for the rods. Within each bracket also there is by preference mounted a spring 6 carrying a U-shaped yoke 7 through which the rod 2 is passed, and between the arms of the yoke is a grooved pulley 8 as best seen in Fig. 5. The contractile tendency of the spring 6 draws this yoke and its pulley toward the mold board, and swings the lower end of each rod 2 inward, whereas the eye 3 in the bracket 4 permits the vertical movement of the rod but prevents swinging in at its upper portion, and the result of the combined use of the eye and the pulley is that the scraping blade is borne constantly toward the dished face of the mold board for a purpose which will appear.

The numeral 10 designates an inverted U-bar, one leg being attached to the center of the scraping blade 1 at the point 11 and its other leg preferably carrying a roller 12 mounted within a fork in said leg and on a pin whose extremities are bent into eyes 13 as seen in Fig. 3. These eyes are by preference connected by contractile springs 14 with the attaching plates 15 at the lower ends of the brackets 4, and their normal tendency is to raise the U-bar which in turn raises the blade 1, its rods 2 sliding upward through the eyes 3. A yoke 16 is hung in said eyes 13, and attached to said yoke is a cord 17 which passes downward under a pulley 18 on the inside or back of the mold board M and upward over a pulley 19 on the handles H, and its extremity carries a hand-grip 20. When now the operator draws upon this grip, without necessarily loosening its hold on the handles, the cord draws the yoke downward and it expands or stretches the springs 14, and the U-bar causes the downward movement of the scraping blade in a manner which will be clear. As this blade descends (see Fig. 4) along the curved dished face of the mold board M, it swings outward a little, but this is permitted by the expansion of the springs 6 which carry the rollers or pulleys 8, while the rods 2 slide through the eyes 3.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a plow scraper, the combination with a blade disposed on the dished side of the mold board, a pair of upright rods rising rigidly therefrom, and guides in which said rods are mounted; of a U-bar whereof one leg is connected with said blade and the other leg has a roller traveling on the other side of the mold board, and means for manually moving the U-bar downward, for the purpose set forth.

2. In a plow scraper, the combination with a blade disposed on the dished side of the mold board, a pair of upright rods rising rigidly therefrom, and guides in which said rods are mounted; of a U-bar whose outer leg is connected with said blade and whose inner leg has a roller traveling on the inner side of the mold board, springs normally raising said inner leg, a cord connected with said leg and leading downward over a pulley on the mold board and upward along the handle, and a hand grip at the rear end of said cord.

3. In a plow scraper, the combination with a pair of brackets adapted for attachment to the upper edge of the mold board and having eyes, contractile springs connected with said brackets, and a yoke carried by each spring and having a pulley journaled between its arms; of a scraping blade slidably mounted on the outer face of the mold board, upright rods rising therefrom through said yokes and the eyes of the brackets, and means for manually moving the blade and sliding its rods.

4. In a plow scraper, the combination with a pair of brackets adapted for attachment to the upper edge of the mold board and having eyes, contractile springs connected with said brackets, and a yoke carried by each spring and having a pulley journaled between its arms; of a scraping blade slidably mounted on the outer face of the mold board, upright rods rising therefrom through said yokes and the eyes of the brackets, a U-bar whose outer arm is connected with the mid-length of said blade and whose inner arm stands at the rear of the mold board, springs normally raising said inner arm, and manually operable mechanism for depressing it against the tendency of said springs.

5. In a plow scraper, the combination with a pair of brackets adapted for attachment to the mold board and having eyes, contractile springs connected with said brackets, and a yoke carried by each spring and having a pulley journaled within it; of a scraping blade slidably mounted on the outer face of the mold board, upright rods rising therefrom through said yokes and the eyes of the bracket, a U-bar whose outer arm is connected with the mid-length of said blade and whose inner arm stands at the rear of the mold board, springs connecting this arm with said brackets for normally raising the arm, a yoke attached to this arm, and a cord leading from said yoke downward over a pulley on the mold board and upward to within reach of the operator.

6. In a plow scraper, the combination with a pair of brackets adapted for attachment to the upper edge of the mold board and having eyes, contractile springs connected with said brackets, and a yoke carried by each spring and having a pulley journaled within it; of a scraping blade slidably mounted on the outer face of the mold board, upright rods rising therefrom through said yokes and the eyes of the brackets, a U-bar whose outer arm is connected with said blade and whose inner arm extends down in rear of the mold board and is forked, a pin through the fork arms and having eyes at its extremities, contractile springs connecting said eyes with said brackets, a yoke hung in said eyes, a cord connected with the center of said yoke and leading downward over a pulley on the mold board and upward along the plow-handles, and a hand-grip at the remote end of said cord.

7. In a plow scraper, the combination with a scraper bar standing horizontal against the dished side of the mold board, and a pair of rods rising rigidly from said bar near its ends; of a pair of brackets secured to the rear face of said mold board along its upper edge and having eyes through which said rods slide loosely, yielding means interposed between the upper ends of said brackets and the scraping bar for pressing the latter normally toward the mold board, manually operable mechanism for depressing said blade, and spring means for raising it as described.

In testimony whereof I affix my signature in presence of two witnesses.

THEODORE W. GLASSEY.

Witnesses:
A. R. GLASSEY,
SARAH S. GLASSEY.